July 17, 1928.
D. ALBRECHT
1,677,378
DEVICE FOR INDICATING THE QUOTIENT OF TWO ELECTRICAL QUANTITIES
Filed Oct. 20, 1926
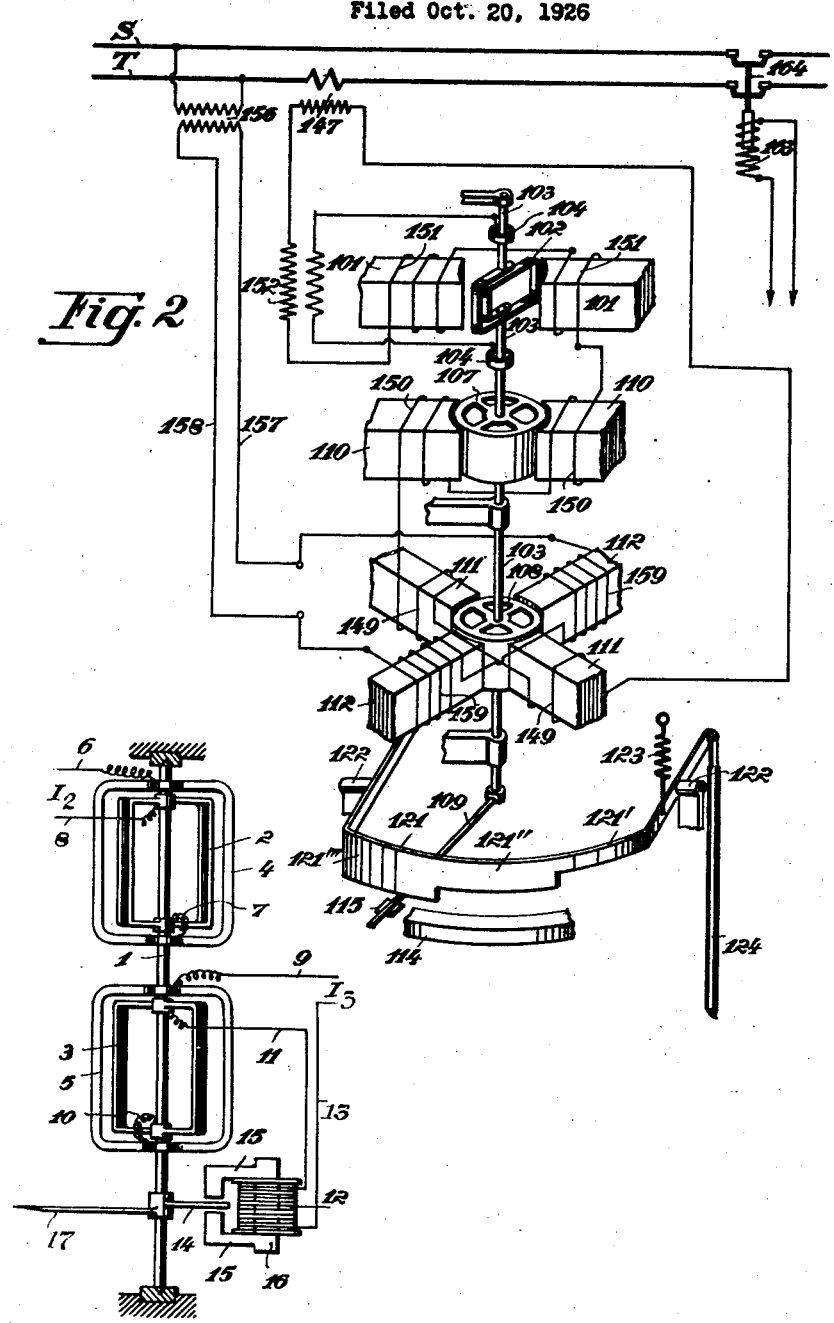
Inventor:
Dieter Albrecht
by Lotka, Kehlenbeck & Farley
Attorneys Patented July 17, 1928.

1,677,378

UNITED STATES PATENT OFFICE.

DIETER ALBRECHT, OF BERLIN, GERMANY, ASSIGNOR TO SIEMENS & HALSKE, AKTIEN-GESELLSCHAFT, OF SIEMENSSTADT, NEAR BERLIN, GERMANY, A CORPORATION OF GERMANY.

DEVICE FOR INDICATING THE QUOTIENT OF TWO ELECTRICAL QUANTITIES.

Application filed October 20, 1926, Serial No. 142,877, and in Germany July 4, 1925.

My invention relates to a device for indicating the quotient of two physical quantities, such as two electric currents. The known devices of this kind are open to the objection that for a given angle of deflection of the pointer the damping forces as well as the driving torques acting upon it vary with the arrangement and the magnitude of the two directional forces which originate from the two physical quantities the quotient of which is to be measured. Owing to the varying damping of the movable system, in the case of very small or very large directional forces, the accuracy of adjustment of the pointer is not very considerable. Should the quotient of two electric currents be indicated by a moving-coil instrument, for instance, breakdowns of the moving coils traversed by the currents may, furthermore, occur if the currents are large.

The object of my invention is to eliminate the above enumerated objections. I attain this result by making the braking torque acting upon the pointer spindle proportional to one of the physical quantities. In this way a damping is obtained in the improved device which has always the same value for a given angle of deflection, of whatever magnitude the directional forces may be which are caused by the electric currents, for instance. Such a damping may in the indication of the quotient of two currents, for instance, be so attained that an electromagnet produces eddy currents in one of the rotary parts and is energized by one of the two currents, the quotient of which is to be determined.

In the drawing affixed hereto a number of embodiments of my invention are illustrated by way of example, in which:

Fig. 1 shows the application of my invention to a moving-coil instrument, and

Fig. 2 shows the application of my invention to a fault locating relay, i. e., a relay for the protection of electric lines the movable member of which sets itself in accordance with the location of the fault which has developed in the supervised line.

Referring to Fig. 1 of the drawing, it will be seen that upon a spindle 1 a pointer 17 is mounted which moves along a scale to indicate the deflection of spindle 1 from its normal or zero position. It may also, if desired, be arranged to close electrical contacts in the known manner. Upon the spindle 1 are also mounted two coils 2 and 3 which are angularly displaced in relation to each other. The coil 2 moves in the field of a stationary coil 4 and the coil 3 in the field of a stationary coil 5. The two currents the quotient of which is to be determined are designated as $I_2$ and $I_3$. The current $I_2$ flows through the lead 6 into the stationary coil 4 and passes through the flexible lead 7 into the movable coil 2 whence it is led away at 8. The current $I_3$ enters the stationary coil 5 through the lead 9, passes through the flexible conductor 10 into the moving coil 3 and through the connection 11 to the magnet winding 12. It leaves through the line 13, the arrangement being such that the driving torques of the two currents are opposed to each other. It is well known that with such a connection of the coils the rotary members will be in equilibrium when pointer 17 is deflected from its zero position by an angle which is a function of the ratio of the two currents $I_2$ and $I_3$. Thus if the direction of current $I_2$ is such as to tend to turn pointer 17 in the clockwise direction, current $I_3$ tends to turn the pointer in the counterclockwise direction, and said pointer will reach a state of equilibrium at some point where $M_2$ (the torque produced by current $I_2$) equals $M_3$ (the torque produced by current $I_3$). If $f_2(\alpha)$ and $f_3(\alpha)$ are functions (for instance, the sine and the cosine respectively, of $\alpha$, the angle of deflection of the pointer, and $K_2$ and $K_3$ are constants, we have $$M_2 = K_2 f_2(\alpha) I_2^2$$

and $$M_3 = K_3 f_3(\alpha) I_3^2$$

Then, if $M_2 = M_3$, we have $$K_2 f_2(\alpha) I_2^2 = K_3 f_3(\alpha) I_3^2$$

and $$\frac{I_2^2}{I_3^2} = \frac{K_3}{K_2} \cdot \frac{f_3(\alpha)}{f_2(\alpha)}$$

Extracting the square root, we have $$\frac{I_2}{I_3} = K \cdot f(\alpha),$$

wherein K is a new constant, and $$f(\alpha) = \sqrt{\frac{f_3(\alpha)}{f_2(\alpha)}}$$

Thus the ratio between the two currents will be proportional to a function of the angle of deflection of pointer 17, so that if $I_2$ is fed from a voltage transformer and $I_3$ from a current transformer in the same line, the ratio $\frac{I_2}{I_3}$ is proportional to $\frac{E}{I}$ and to $R$, the resistance in the line. With such an arrangement, the instrument acts as an ohmmeter, but it will be understood that its use is not restricted to the measurement of resistances. If both currents are large they produce a large driving torque which necessitates a correspondingly large damping force. This damping force is produced by the magnet 16 energized by the coil 12 the lines of force of which traverse the brake disc 14 so that the corresponding eddy currents exert a braking force. If the braking force should increase in direct proportion to the current, the path in iron of the lines of force is so strongly saturated in the new device that the flow of the lines of force grows with the square root of the current traversing the coil 12, because the braking force is proportional to the square of the flow of the lines of force. The desired dependence may with satisfactory accuracy be obtained in the simplest manner by constituting the path of the flow of the lines of force of weakly and strongly saturated parts. For this reason the yokes 15 of the path of the lines of force are made of smaller cross-section than the core 16.

If damping is to be applied to an electric moving-coil instrument, the coil of which must be able to withstand high current intensities, it is advisable to eliminate inconveniences liable to be caused by the high torques by designing the instrument in a special manner. The torques become sometimes so high, for instance in measuring instruments which have to stand short-circuit currents, that the moving coils as designed hitherto are unable to withstand them. It is well known that moving coils cannot be constructed of any desired current strength as otherwise their mechanical inertia becomes so great that the rotary system moves too slowly in the case of a small current and is too difficult to damp in the case of a large current. The damping may, however, by the Ferraris system illustrated in Fig. 1 be brought to an approximately constant value for any angle of deflection. In order that the moving system may also comply with the above mentioned demands of practical application, the moving coil mounted upon the pointer spindle should preferably be formed by a single current loop, and the alternating current should be supplied to it across an auxiliary current transformer which steps up the current so far that the current loop suffices for generating the necessary torque.

My invention is of particular importance for fault locating relays. These relays are sometimes exposed to strong short-circuit currents and must immediately adjust themselves correctly and reliably. They should, however, likewise work accurately with low current intensities. In any case the indicator instrument of a fault locating relay should set itself so quickly that the magnitude of the short-circuit current, as existing immediately after the development of the short circuit, is indicated, because the electric conditions in the circuit after the short-circuit may change substantially within a few seconds.

In Fig. 2 a further embodiment of my invention is illustrated as applied to an indicating instrument of a fault locating relay. The pointer 109 should indicate the resistance of a short-circuit circuit. It is mounted upon a spindle 103, which also carries the moving coil 102 and the Ferraris drums 107 and 108. The moving coil 102 consists of one and a half turns of aluminium wire. For the sake of greater strength duraluminium is preferably employed. The coil moves in the field of the current magnet 101. The current is introduced through mercury contacts 104, not directly from the current transformer 147, but across the transformer 152. This latter steps up the current so far that even for the smallest values existing it suffices to generate an ample torque at moving coil 102. The Ferraris drum 107 revolves in the field of the current magnet 110, the Ferraris drum 108 on the other hand in the fields of two pairs of magnets, viz, the current magnets 111 and the potential magnets 112. Within the Ferraris drums 107 and 108 are located stationary iron cores which are not visible in the drawing. These cores serve to reduce the reluctance of the paths of the magnetic lines. The moving coil 102 generates a torque which is a function of $I_2$, the square of the current intensity, while the Ferraris drum 108 generates a torque which is a function of $IE$, the product of voltage and current intensity. As pointed out above, the pointer 109 sets itself so that its angle of deflection is a function of the quotient of the two values and is thus a function of the resistance in the line to be supervised. Preferably the arrangement is such that the pointer 109 indicates the reactance of the line. The Ferraris drum 107 does not produce a torque at all, but merely serves to damp the motion of the entire movable system, with a damping force which is proportional with the strength of the current.

Above the indicating scale of the pointer 109 a drop bow 121 is located which is pivoted in the bearings 122. This bow is normally maintained in the raised position by a spring 123, but may be moved downwardly by means of a connecting rod 124 as soon as a fault develops in the line. Its front face has three parts 121', 121", and 121'" of different width. The movement of bow 121 is therefore dependent on the position of the pointer which, upon being depressed, is forced against a support 114. Connecting rod 124 may be arranged to open the oil switches which serve to disconnect the faulty sections, in a manner not illustrated. The pointer must under all circumstances have reached a position of equilibrium before it is arrested by the drop bow. This is only possible if the entire rotating system is designed light, but yet strong enough to withstand even large torques. For this reason the Ferraris parts 107 and 108 are not designed as discs, as customary, but as hollow drums. A drum has the advantage over the disc that all force-developing parts have the same lever arm. The drum is therefore at equal torque lighter than a disc, because in the case of the disc the extreme edges participate only very little in producing the torque, but increase the weight considerably.

In order to be able to make the spindle also as light as possible, the damping system 107 is located between the two driving systems 102 and 108. It is necessary to dimension the spindle so that it is sufficiently strong also in case that in consequence of reversed energy direction the two systems 102 and 108 act in the same direction. Its torque must then be taken up by the damping system 107 until the limit of deflection is attained. If this system were located at one end, the sum of the torques would act upon the spindle. In the arrangement illustrated, on the other hand, the spindle torques are balanced.

In Fig. 2 of the drawing a single-phase line with the outward and return leads S and T is assumed. It can be disconnected by the oil switch 164 as soon as the release coil 163 is excited. The current transformer 147 feeds the current transformer 152, the current coils 151, 150 and 149. A potential transformer 156 feeds the potential coil 159 across the lines 157 and 158.

In the moving-coil instruments illustrated in the Figs. 1 and 2 it is, furthermore, advisable to design the leads for the moving coil in a special manner. If, as in the hitherto known moving-coil instruments the current is supplied to the coil by means of a flexible conductor, the resiliency of this flexible line must not be too great. In instruments the rotatable part of which should operate entirely without directional force, a spring force should not develop at all.

I desire to have it distinctly understood that I do not intend to limit myself to the exact details shown or described, but that I intend to include as part of my invention all such changes and modifications of parts as would suggest themselves to persons skilled in the art and as would fall within the scope of the claims.

I claim as my invention:—

1. In a device for determining the quotient, of two physical quantities, in combination, a pointer spindle, driving means adapted to set said pointer spindle according to the quotient of two electric currents, a hollow drum of metal connected with said pointer spindle, and an electromagnet adapted to generate eddy currents in the said hollow drum, said electromagnet being energized in proportion to the value of one of said electric currents.

2. In a device for determining the quotient, of two physical quantities, in combination, a pointer spindle, a driving system for said pointer spindle operated by an alternating current, a second driving system for said pointer spindle operated by a second alternating current, said first and said second driving systems being adapted to set said pointer spindle according to the quotient of said two alternating currents, and damping means for said spindle located between said first and said second driving system and arranged to be energized in proportion to the strength of one of said alternating currents.

3. In a device for determining the quotient of two physical quantities, in combination, a pointer spindle, an alternating current line, a first driving system for said pointer spindle operative in dependence of the voltage of said alternating current line, a second driving system comprising a coil mounted on the said pointer spindle and a transformer electrically connected with said coil for stepping up the current of said alternating current line, said first and said second driving system being adapted to set said pointer spindle according to the quotient of the voltage and the current of the said alternating current line and electric damping means for said spindle interposed between said driving systems and adapted to be energized in proportion to a characteristic of the current in the said alternating current line.

4. In a device of the class described, a pointer spindle, a coil fixed to said pointer spindle to rotate therewith, a source of alternating current, electrical connections between said source and said coil including mercury vessels mounted on said spindle, driving means adapted to set said pointer spindle according to the ratio of said alternating current to another electrical current, and damping means for said pointer spindle energized in proportion to the magnitude of one of said currents.

5. In a device of the class described, a pointer spindle, a coil fixed to said spindle to rotate therewith, a source of alternating current, electrical connections between said source and said coil including a part of said spindle and mercury vessels mounted thereon, driving means adapted to set said pointer spindle according to the ratio of said alternating current to another electrical current, and electrical damping means comprising a drum mounted on said spindle and an electromagnet constructed and arranged to generate eddy currents in said drum and energized in proportion to the strength of one of said currents.

In testimony whereof I affix my signature.

DIETER ALBRECHT.